US009188169B2

United States Patent
Kume

(10) Patent No.: US 9,188,169 B2
(45) Date of Patent: Nov. 17, 2015

(54) SHIFT DEVICE WITH SYNCHRONIZER

(71) Applicant: KYOWA METAL WORKS CO., LTD., Kanagawa-ken (JP)

(72) Inventor: Tatsuya Kume, Kanagawa-ken (JP)

(73) Assignee: KYOWA METAL WORKS CO., LTD., Kanagawa-Ken (JP)

( * ) Notice: Subject to any disclaimer, the term of this patent is extended or adjusted under 35 U.S.C. 154(b) by 0 days.

(21) Appl. No.: 14/324,578

(22) Filed: Jul. 7, 2014

(65) Prior Publication Data
US 2015/0027255 A1 Jan. 29, 2015

(30) Foreign Application Priority Data
Jul. 24, 2013 (JP) .................................. 2013-153144

(51) Int. Cl.
*F16H 3/38* (2006.01)
*F16D 23/02* (2006.01)
*F16D 23/04* (2006.01)
*F16D 11/14* (2006.01)
*F16D 23/06* (2006.01)

(52) U.S. Cl.
CPC .............. *F16D 23/025* (2013.01); *F16D 11/14* (2013.01); *F16D 23/04* (2013.01); *F16D 2023/065* (2013.01); *F16D 2023/0618* (2013.01)

(58) Field of Classification Search
CPC ............ F16H 61/0403; F16H 2306/48; F16D 23/025; F16D 23/06; F16D 23/08
USPC ....... 74/336 R, 339; 192/53.31, 53.32, 53.33, 192/53.34
See application file for complete search history.

(56) References Cited

U.S. PATENT DOCUMENTS

| 3,620,338 | A | * | 11/1971 | Tomita et al. | ............ 192/53.343 |
| 5,092,439 | A | * | 3/1992 | Reynolds | ................. 192/53.331 |
| 5,135,087 | A | * | 8/1992 | Frost | .......................... 192/53.31 |
| 6,419,063 | B1 | * | 7/2002 | Smith | ......................... 192/53.31 |
| 9,027,426 | B2 | * | 5/2015 | Roper | ............................. 74/339 |

FOREIGN PATENT DOCUMENTS

| JP | 2007-285400 | 11/2007 |
| JP | 4609796 | 1/2011 |

* cited by examiner

*Primary Examiner* — Ha D Ho
(74) *Attorney, Agent, or Firm* — Wenderoth, Lind & Ponack, L.L.P.

(57) ABSTRACT

A shift device has thrust pieces to change force in a radial direction to thrust when they swing relative to and contact with a hub. The thrust pieces respectively are fixed with holders each containing a ball and a spring. The springs elastically press the balls outwardly in the radial direction against the groove of the shift sleeve, pressing the radially inner surfaces of the thrust pieces on the guide surfaces of the hub through the holders to be configured in such a way that a clearance between the radially outer surfaces of the thrust pieces and the inner surface of the shift sleeve is ensured and the thrust pieces can swing being guided along the guide surfaces.

8 Claims, 8 Drawing Sheets

SHIFT DEVICE WITH SYNCHRONIZER

BACKGROUND OF THE INVENTION

1. Field of the Invention

The present invention relates to a shift device with a synchronizer for a transmission in which pressing force applied to a shift sleeve can be amplified into larger pressing force acting on a synchronizer ring while gears of the transmission are shifted, thereby reducing an operating force necessary for a driver or an actuator.

2. Description of the Related Art

A shift device with a synchronizer for a transmission of this kind is disclosed in Japanese Patent No. 4609796 and Japanese unexamined patent application publication No. 2007-285400.

The former conventional shift device has a plurality of thrust pieces. The thrust pieces are formed like a letter "H" when they are seen from an outer side in a radial direction, having a cross section like an arc along an inner surface of a shift sleeve. They are respectively arranged in axial-directional recesses of the shift sleeve at certain even intervals in a circumferential direction of the shift sleeve so as to move in an axial direction in cut-off portions of a hub. An upper surface of the thrust pieces are pushed by a spring shaped like a letter "C" outwardly in the radial direction on an inner surface of the shift sleeve.

The thrust pieces have a projection that is formed at a central position thereof. Each projection is capable of engaging with three circumferential grooves formed on central portions of predetermined three splines in lots of splines of the shift sleeve. The thrust pieces further have first slanted surfaces respectively formed on side surfaces of four projecting portions at four outer corners of the thrust pieces and second slanted surfaces respectively formed on outer surfaces of the projecting portion. The first slanted surfaces correspond to slanted surfaces on the cut-off portions of the hub, while the second slanted surfaces correspond to slanted surfaces formed on the recesses of the shift sleeve.

In the former conventional shift device, when the shift sleeve is positioned at a neutral position, the first slanted surfaces of the thrust pieces are free from a contact with the slanted surfaces of the hub, while the projections thereof engage with the circumferential grooves of the shift sleeve.

On the other hand, when the shift sleeve is shifted toward one of speed gears, the thrust pieces move towards the one of the speed gears in the axial direction in a state where bottom side surfaces of the thrust pieces press projections of a synchronizer ring. At this time, the slanted surfaces of the shift sleeve press the second slanted surfaces of the thrust pieces in the axial direction according to the value of force that presses the thrust pieces outwardly in the radial direction by the spring and the centrifugal force.

The thrust force causes a friction torque between friction surfaces of the synchronizer ring and a cone shaped portion integrally formed with the speed gear. The friction torque draws the synchronizer ring, thereby rotating the synchronizer ring at a predetermined angle in the circumferential direction relative to the hub. Accordingly, the projections of the synchronizer ring contact with the side surfaces of the thrust pieces to press them in the circumferential direction. Consequently, the thrust pieces swing in a state where radially outer surfaces of the thrust pieces are guided along the inner surface of the shift sleeve. This swing movement causes the first slanted surfaces thereof to contact with the slanted surfaces of the hub. The thrust pieces change the friction torque into the thrust pressing the synchronizer ring through the first slanted surfaces of the thrust pieces and the slanted surfaces of the hub.

That is, the bottom side surfaces of the thrust pieces press the projections of the synchronizer ring in the axial direction. When the shift sleeve further moves toward the speed gear, chamfers of the splines of the shift sleeves contact with chamfers of the synchronizer ring. At this time, the thrust pieces are forced to move inwardly in the radial direction against elastic force of the spring through the slanted surfaces of the shift sleeve. This state is maintained until the synchronization is ended, so that the shift sleeve is prevented from further advancing toward the speed gear. In the synchronization operation, the friction torque is determined due to force generated at the synchronizer ring being pressed by the shift sleeve and force generated between the first slanted surfaces of the thrust pieces and the slanted surface of the hub, thereby being amplified. When the synchronization ends, the shift sleeve rotates the synchronizer ring back to its original position, and then the shift sleeve further moves in the axial direction to engage with splines of the speed gear.

On the other hand, the latter conventional shift device has a plurality of thrust pieces similar to those of the former conventional shift device. It differs from the former conventional shift device mainly in the construction and function of springs.

That is, three springs are respectively provided in the thrust pieces arranged at even intervals in the circumferential direction. The springs in the latter conventional shift device use three coil spring instead of only one spring shaped like C in the former conventional shift device. Each coil spring is capable of pressing a ball against a radially inner surface of the shift sleeve, but it is not capable of pressing the thrust pieces outwardly and/or inwardly in the radial direction. The balls and the springs are contained in holders that are inserted in holes formed in center portions of the thrust pieces, respectively. The holders are not fixed to the thrust pieces, and bottom portions (the most-inner portion in the radial direction) thereof contact with bottom surfaces of cut-off portions of a hub so that the springs can press the balls against the inner surface of the shift sleeve and the bottom surfaces of the hub receive reaction forces of the springs.

Between the holders and the thrust pieces, stoppers are provided so as to prevent them from being separated from each other. The operation of the latter conventional shift device is similar to the former conventional shift device except that, in the latter conventional shift device, the springs do not press the thrust pieces on the inner surface of the shift sleeve, but the thrust pieces are pressed on the inner surface of the shift sleeve by the centrifugal force acting on the thrust pieces when a shaft is rotating.

These former and latter conventional shift devices with the synchronizers, however, encounter the following problem.

In the both shift device, the thrust pieces make a swing movement in the amplification operation, where the axes of the thrust pieces and an axis of the shift sleeve shift from in a co-axial relationship to in an oblique relationship. As the both surfaces are formed as a partial portion of an outer surface of a circular cylinder, their axes of the thrust pieces deviate from the axis of the shift sleeve, inclining to the hub when the thrust pieces swing in the synchronizer operation. This swing and inclination movement of the thrust pieces generates a resistance between the radially outer surfaces of the thrust pieces and the radially inner surfaces of the shift sleeve because the radially outer surfaces of the thrust pieces are pressed on the radially inner surface of the shift sleeve by external force such as elastic force of the spring and the centrifugal force. The resistance deteriorates the amplification performance in the synchronization operation of the shift device.

It is, therefore, an object of the present invention is to provide a shift device with a synchronizer for a transmission which overcomes the foregoing drawbacks and in which can decrease a resistance generated due to a contact between thrust pieces and a shift sleeve when the thrust pieces swing relative to a hub in a synchronization operation, thereby improving a synchronization performance.

SUMMARY OF THE INVENTION

According to the present invention there is provided a shift device with a synchronizer which includes a shaft, a hub, a shift sleeve, two speed gears, two synchronizer rings, and a plurality of thrust pieces.

The shaft is capable of transmitting power.

The hub has a boss portion, a flange portion, and an annular portion. The boss portion is fixed to the shaft, the flange portion extends from the boss portion outwardly in a radial direction, and the annular portion is provided on outer side of the flange portion and formed with outer splines on an outer side thereof. The annular portion and the flange portion are formed in an axial direction with a plurality of cut-off portions, which are provided on four corners of end portions in the axial direction with a plurality of slanted surfaces that are capable of changing force in a rotational direction to force acting in the axial force. The hub is further provided with a plurality of guide surfaces.

The shift sleeve is formed on an inner surface thereof with inner splines and a groove having slanted surfaces. The inner splines are engaged with the outer splines of the hub in such a way that the shift sleeve is movable in the axial direction, and they are provided with chamfers on the both end portions of the inner splines.

The speed gears are arranged at the both sides in the axial direction of the hub to be rotatably supported on the shaft. The speed gears are provided at hub sides thereof with a cone-shaped friction surface and outer splines engageable with the inner splines of the shift sleeve.

The synchronizer rings are respectively arranged between the hub and the speed gears. They are provided with a friction surface capable of being pressed selectively by one of the cone-shaped friction surfaces of the speed gears, and they are provided with projections extending in the axial direction and outer splines engageable with the inner splines of the shift sleeve and having chamfers on an outer circumference thereof to be contactable with the chamfers of the shift sleeve.

The plurality of thrust pieces are arranged in the cut-off portions of the hub, respectively, having radially outer surfaces, radially inner surfaces, and slanted surfaces on four corner sides to be contactable with the slanted surfaces of the hub to change the force in the rotational direction generated due to friction torque between the friction surfaces to the force acting in the axial force when the thrust pieces swing relative to the hub. The thrust pieces are provided with depressed portions to be contactable with the projections of the synchronizer rings, and they respectively have holders each containing a ball and a spring.

The holders are fixed to the thrust pieces.

The springs elastically press the balls outwardly in the radial direction against the groove of the shift sleeve, pressing the radially inner surfaces of the thrust pieces on the guide surfaces of the hub through the holders to be configured in such a way that a clearance between the radially outer surfaces of the thrust pieces and the inner surface of the shift sleeve is ensured and the thrust pieces can swing being guided along the guide surfaces.

Preferably, the inner surfaces of the thrust pieces and the guide surfaces of the hub are formed as a flat surface.

Preferably, the holders are formed like a cylinder, and they are press-fitted into the holes formed in center portions of the thrust pieces, respectively.

Preferably, bottom portions f the holders are apart from bottom portions of the cut-off portions.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
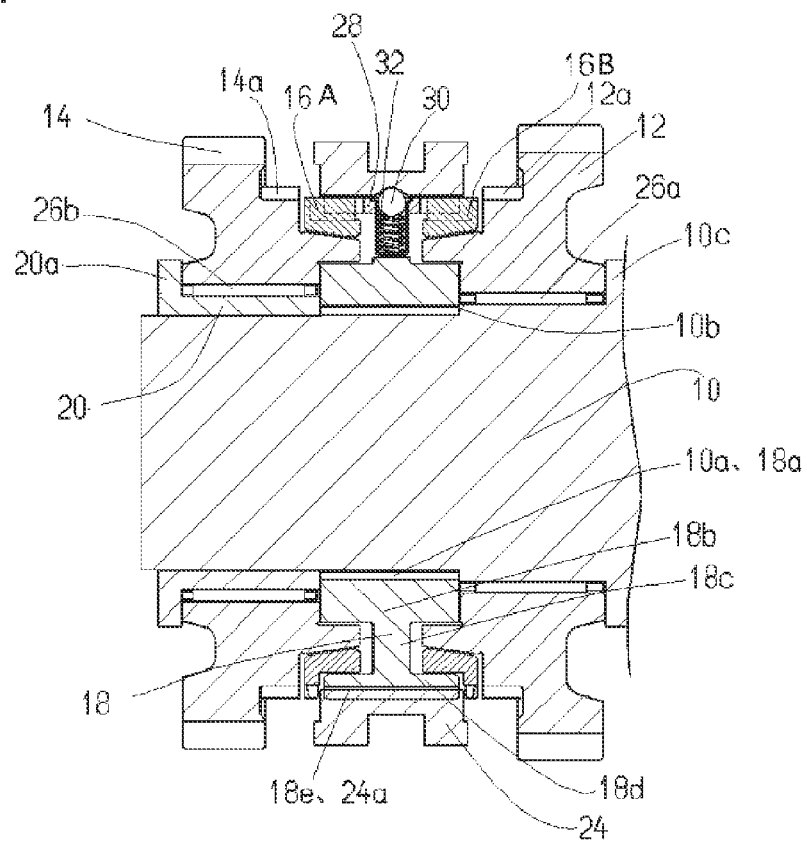
FIG. 1 is a cross-sectional side view showing a shift device with synchronizers for establishing a first speed and a second speed of an embodiment according to the present invention, taken along a line A-A in FIG. 2.

Throughout the following detailed description, similar reference characters and numbers refer to similar elements in all figures of the drawings, and their descriptions are omitted for eliminating duplication.

Figure 2:
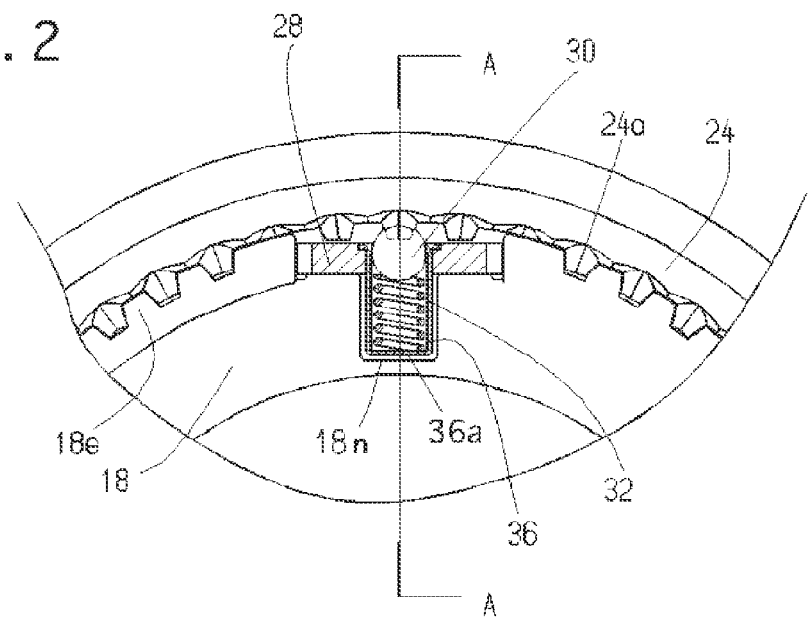
FIG. 2 is an enlarged front view showing the shift device shown in FIG. 1, where a first speed gear, a second speed gear, and the synchronizers are removed so as to be easily understood when it is seen from a first gear side.
Figure 3:
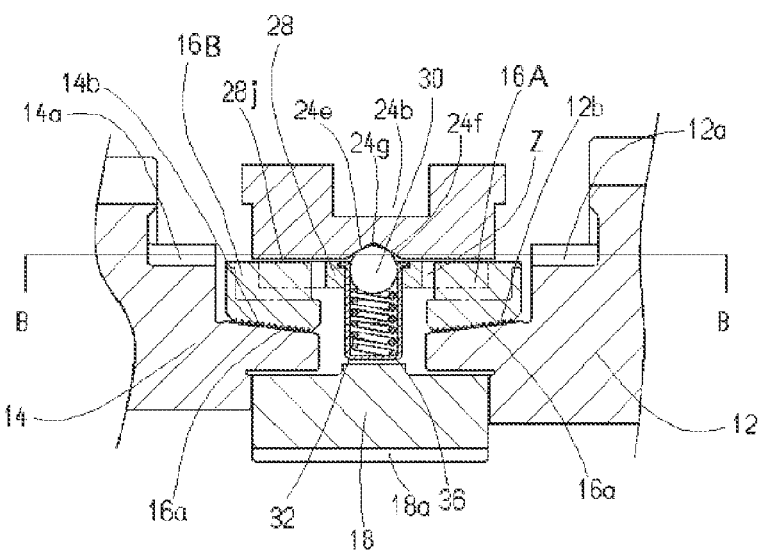
FIG. 3 is an enlarged partial side view of the shift device of the embodiment shown in FIG. 1.

Referring to FIGS. 1 to 3, there is shown a shift device of a preferred embodiment according to the present invention, which is applied to a transmission for a motor vehicle. In the embodiment, the shift device is used to selectively establish a first speed and a second speed in the transmission.

The shift device includes an output shaft 10 functioning as a counter shaft, a hub 18, a first-speed gear 12, a second-speed gear 14, a shift sleeve 24, two synchronizer rings 16A and 16B, and three thrust pieces 28.

The output shaft 10 is connected with a pair of not-shown drive wheels through a not-shown final unit having differential gears to drive the vehicle. The output shaft 10 is provided with a plurality of outer splines 10a on an external surface of a certain partial portion next to a large-diameter portion 10b thereof. The outer splines 10a are engaged with a plurality of inner splines 18a formed on a boss portion 18b of the hub 18. The hub 18 is sandwiched by a bush 20 and the large-radial portion 10b of the output shaft 10 to be restrained from moving in an axial direction. The output shaft 10 corresponds to a shaft of the present invention.

The first-speed gear 12 is rotatably supported on the output shaft 10 through a needle bearing 26a between the boss portion 18b of the hub 18 and another large-diameter portion 10c of the output shaft 10. Similarly, the second-speed gear 14 is rotatably supported on the bush 20 through a needle bearing 26b between the boss portion 18b of the hub 18 and a flange portion 20a of the bush 20 fixed to the output shaft 10. Therefore, the first-speed gear 12 and the second-speed gear 14 are arranged at the both sides of the hub 18, respectively.

The first-speed gear 12 and the second-speed gear 14 are always engaged with a not-shown first input gear and a not-shown second input gear, respectively. The input gears are integrally formed with a not-shown input shaft, which is arranged parallel to the output shaft 10. The input shaft is capable of being inputted with output power from a not-shown engine.

The first-speed gear 12 is provided on its hub side portion with a plurality of outer splines 12a and a cone-shaped friction surface 12b. Similarly, the second-speed gear 14 is provided on its hub side portion with a plurality of outer splines 14a and a cone-shaped friction surface 14b. The diameters of the outer splines 12a and the outer splines 14a are set to have the same diameters to be engageable with inner splines 24a of the shift sleeve 24.

The first-speed gear 12 and the second-speed gear 14 correspond to speed gears of the present invention.

Figure 4:
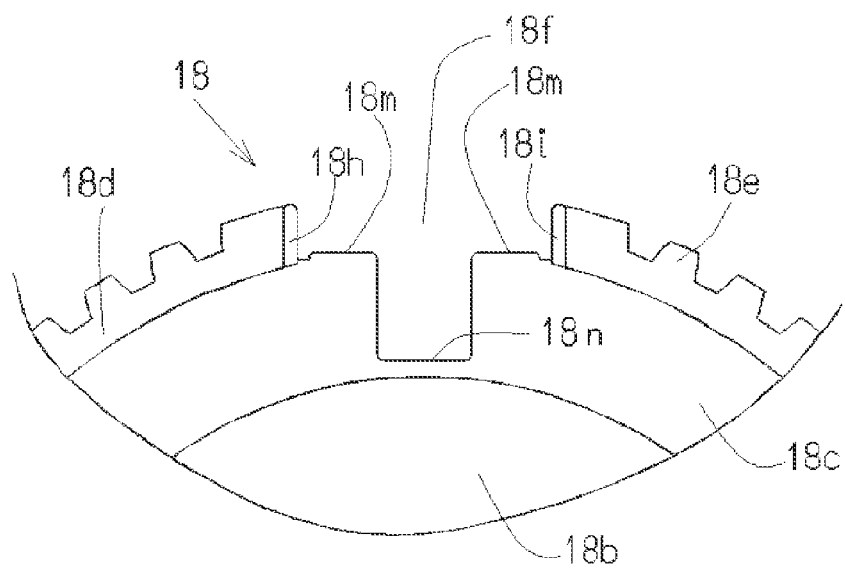
FIG. 4 is an enlarged cross-sectional front view showing a hub that is used in the shift device of the embodiment.
Figure 5:
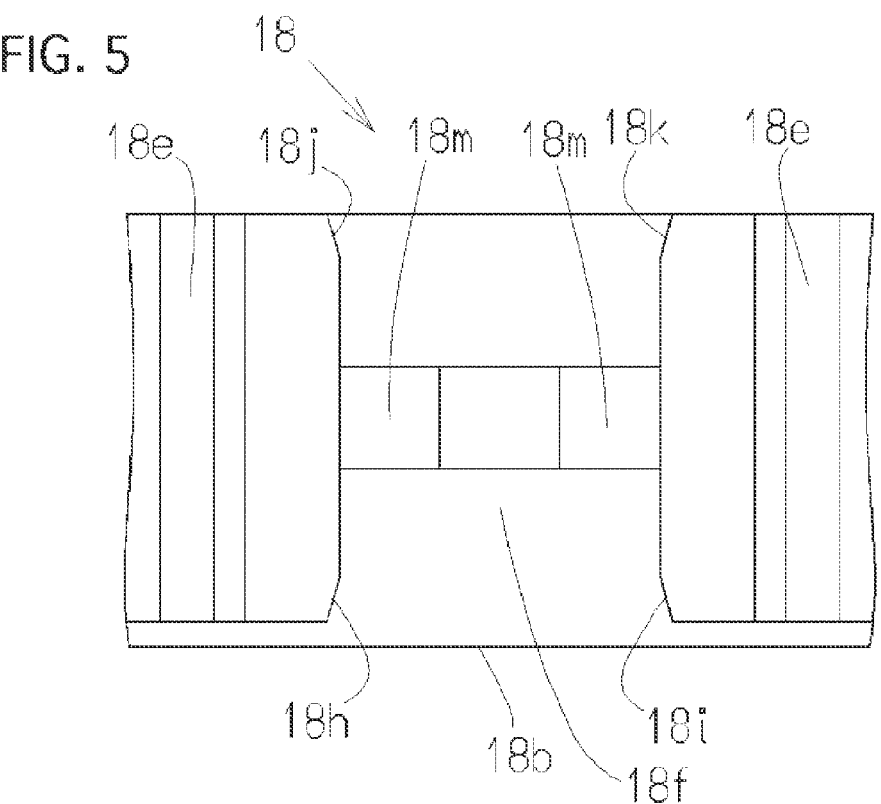
FIG. 5 is a development partial view of the hub shown in FIG. 4 when it is seen from an upper side in FIG. 4.

As shown in FIGS. 4 and 5, the hub 18 includes the boss portion 18b, a flange portion 18c extending from the boss portion 18a extending outwardly in the radial direction, and an annular portion 18d formed on an outer circumferential end portion of the flange portion 18c. Three cut-off portions 18f are formed in the hub 18 at even intervals in a circumferential direction to extend from the flange portion 18c to the annular portion 18d. The cut-off portions 18f open toward an outer side in the radial direction, and they respectively receive the thrust pieces 28, which will be later described. The annular portion 18d is provides on its outer portion with a plurality of outer splines 18e.

On four top portions at the both sides in the axial direction of each of the cut-off portions 18f, slanted surfaces 18h, 18i, 18j, and 18k are formed so as to be capable of selectively contacting the thrust pieces 28 to change a rotative force to a thrust due to a swing movement of the thrust pieces 28. The annular portion 18d is formed with guide surfaces 18m, which are provided in the circumferential direction between the slanted surfaces 18h and 18i and between the slanted surfaces 18j and 18k, sandwiching the cut-off portions 18f. The guide surfaces 18m are formed as flat surfaces so that they contact with the inner surfaces of the thrust pieces 28 to smoothly guide the thrust pieces 28 when the thrust pieces 28 make the swing movement relative to the hub 18.

The shift sleeve 24 is formed on an outer circumferential portion thereof with a circumferential fork groove 24b, as shown in FIGS. 1 and 3, which receives a not-shown shift fork relatively slidably in the circumferential portion. The shift fork is manually operated by a driver or automatically operated by a not-shown actuator to move in the axial direction.

Figure 6:
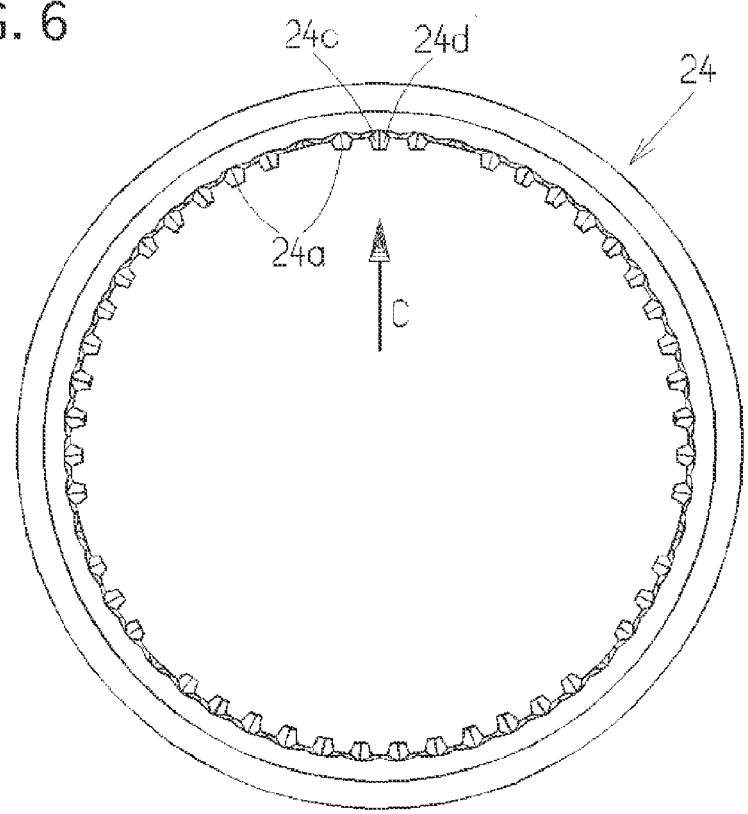
FIG. 6 is a front view showing a shift sleeve that is used in the shift device of the embodiment.
Figure 7:
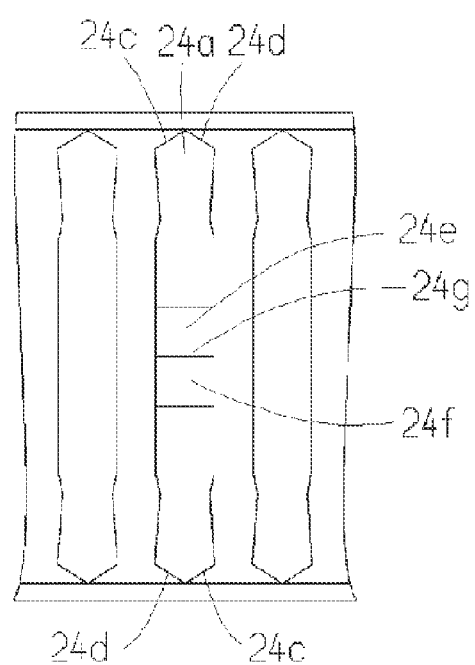
FIG. 7 is an enlarged view of an inner surface of the shift sleeve when it is seen from an inner side to an outer side thereof in a radial direction as indicated by an arrow C in FIG. 6.

As shown in FIGS. 6 and 7, the shift sleeve 24 is provided with a plurality of inner splines 24a on an inner surface thereof to always engage with the inner splines 18e of the hub 18 to rotate together with the hub 18 and the output shaft 10 and allow the axial movement relative to the hub 18.

When the shift sleeve 24 is positioned at a neutral position shown in FIGS. 1 and 3, the inner splines 24a of the shift sleeve 24 engage only with the outer splines 18e of the hub 18.

When it is positioned at a first speed position, the inner splines 24a of the shift sleeve 24 engage with the outer splines 12a of the first-speed gear 12, maintaining an engagement with the outer splines 18e of the hub 18.

On the other hand, when it is positioned at a second speed position, the inner splines 24a of the shift sleeve 24 engage with the outer splines 14a of the second-speed gear 14, maintaining an engagement with the outer splines 18e of the hub 18

In addition, the inner splines 24a are provided with chamfers 24c and 24d on the both end portions in the axial direction of the inner splines 24a. The chamfers 24c and 24d of the shift sleeve 24 are capable of contacting with chamfers 16c and 16d of the synchronizer rings 16A and 16B, respectively, when the shift sleeve 24 is moved toward any one of the first-speed gear 12 and the second-speed gear 14, which will be later described in detail.

Three splines, which are positioned at even intervals in the circumferential direction, of the inner splines 24a are provided with a groove 24g formed by two slanted surfaces 24e and 24f in the circumferential direction on the central portions of the three splines to be capable of receiving three balls 30 provided in the thrust pieces 28, respectively.

Figure 8:
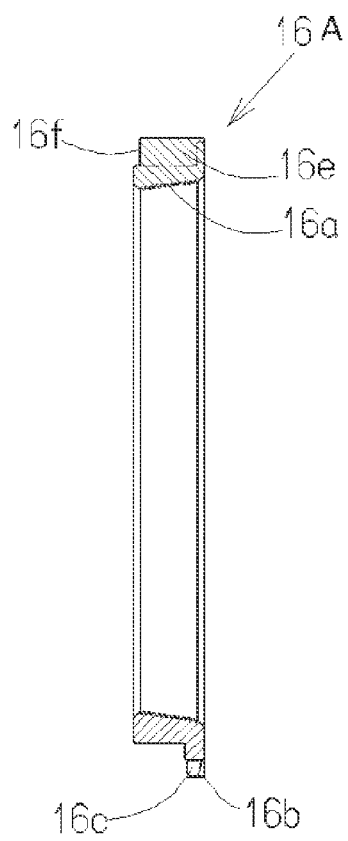
FIG. 8 is a cross-sectional side view of the synchronizer ring that is used in the shift device of the embodiment.
Figure 9:
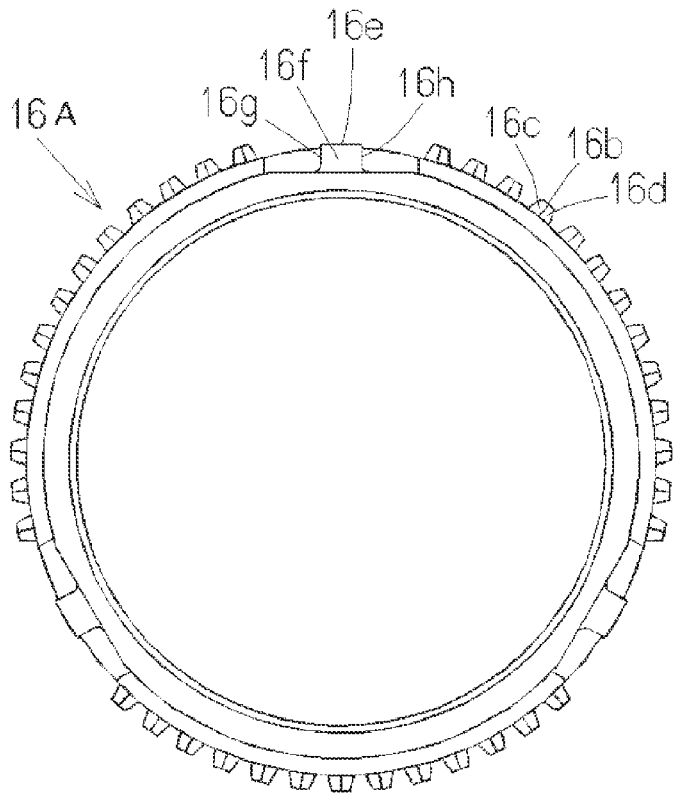
FIG. 9 is a front view of the synchronizer ring shown in FIG. 8.
Figure 10:
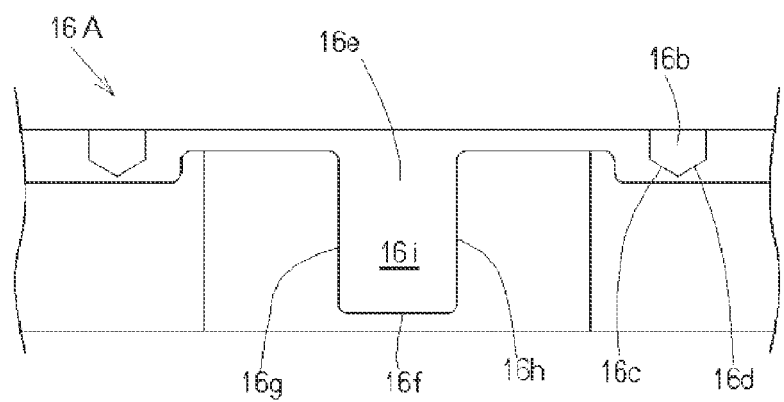
FIG. 10 is an enlarged development partial view of the synchronizer ring shown in FIG. 8 when it is seen from the outer side in the radial direction in FIG. 8.

FIGS. 8 to 10 show the synchronizer ring 16A for the first speed. The synchronizer ring 16B for the second speed has the same shape, so that it is omitted illustrated in the drawing. They are arranged symmetrical to each other with reference to the hub 18 as shown in FIGS. 1 and 3. That is, the synchronizer ring 16A is arranged between the first-speed gear 12 and the hub 18, while the synchronizer ring 16B is arranged between the second-speed gear 14 and the hub 18.

The synchronizer rings 16A and 16B are provided on inner surfaces thereof with fiction surfaces 16a corresponding to the cone-shaped friction surface 12a of the first-speed gear 12 and the cone-shaped friction surface 14b of the second-speed gear 14 to be contactable therewith, respectively. When the friction surface 16a and the cone-shaped friction surface 12a are pressed on each other, friction torque generates therebetween to perform the synchronization operation. Similarly, when the friction surface 16a and the cone-shaped friction surface 14a are pressed on each other, friction torque generates therebetween to perform the synchronization operation.

In addition, the synchronizer rings 16A and 16B are provided with a plurality of outer splines 16b corresponding to the inner splines 24a of the shift sleeve 24 to be engageable with each other. The outer splines 16b are formed with chamfers 16c and 16d on the both end portions in the axial direction of the outer splines 16b. Further, on the outer circumferential portions of the synchronizer rings 16A and 16B at three positions at even intervals in the circumferential direction, three projections 16e are projected from an outer annular portions thereof at the sides opposite to the hub sides toward the hub sides, being short of the hub side edges of the synchronizer rings 16A and 16B as shown in FIG. 10.

The projections 16e are shaped like a rectangular column, projecting outwardly in the radial direction and toward the first speed gear 12 and the second speed gear in the axial direction from a first-speed gear side and a second-speed gear side, respectively, to have an end surface 16f at the hub side end portions thereof, two side surfaces 16g and 16h extending in the axial and radial directions and parallel to each other, and a top surface 16i at the most outwardly in the radial direction. The projections 16e are capable of contacting with the thrust pieces 28, which will be later described.

Figure 11:
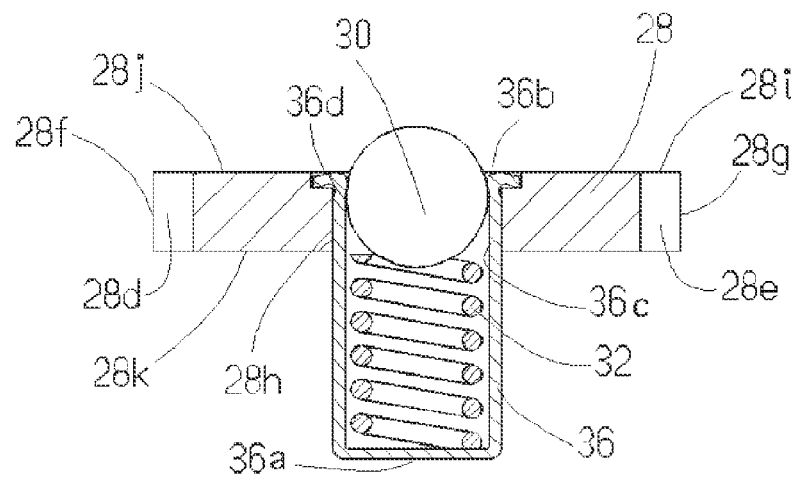
FIG. 11 is an enlarged cross sectional view taken along a line D-D and showing a thrust piece with a ball, a spring, and a holder that are used in the shift device of the embodiment.
Figure 12:
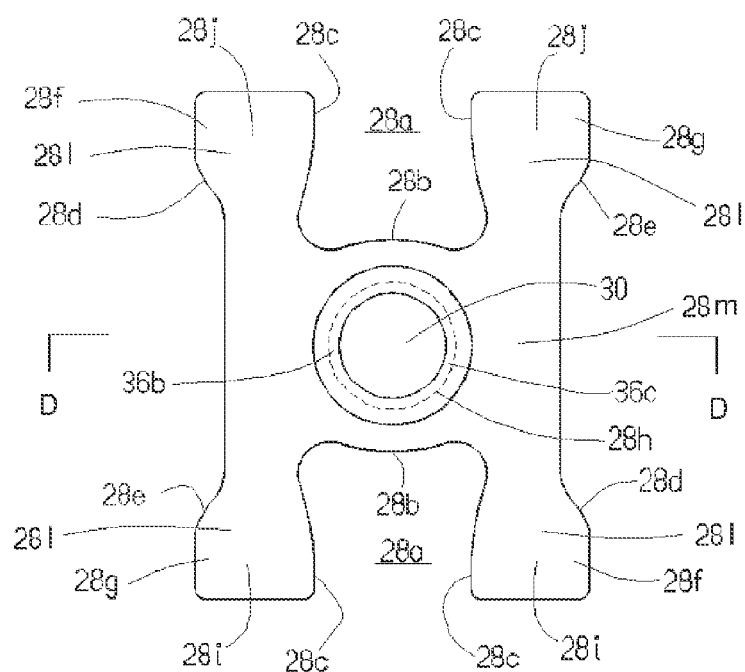
FIG. 12 is a top plan view of the thrust piece shown in FIG. 11 when it is seen from the outer side in the radial direction in FIG. 11.

The shift device has the three thrust pieces 28 in the embodiment, but hereinafter a construction of only one of them will be described in detail with reference to FIGS. 11 and 12 because they are formed to have the same shapes and constructions.

The thrust pieces 28 are a plain plate formed like a letter "H" when they are seen from the upper sides in the radial direction when the thrust pieces 28 are assembled in the shift device. Each thrust piece 28 has an outer surface 28j facing toward the outer side in the radial direction and an inner surface 28k facing toward the inner side in the radial direction. The outer surface 28j and the inner surface 28k are formed to have a flat surface in the embodiment, although they are not limited to flat surfaces as will be later described.

Specifically, it has a center portion 28m and four arm portions 28l, where two of the four arm portions 28l project from the center portion 28m in one axial direction (and toward the first-speed gear side when it is assembled in the shift unit) and the rest two arm portions 28l thereof project from the center portion 28m in the other axial direction (and toward the second-speed gear side when it is assembled in the shift unit).

The thrust piece 28 is provided with two depressed portions 28a that are arranged in the axial direction, being symmetrical with respect to the center portion 28m. The depressed portions 28a are defined by two side surfaces 28c of side walls of the arm portions 28l and a bottom side surface 28b of the center portion 28m, opening in the direction departing from the center portion 28m to receive the projections 16e of the synchronizer rings 16A and 16B. Bottom-side-surface side portions of the depressed portions 28a are set wider than an entrance thereof so that the thrust pieces 28 can slightly swing relative to the projections 16e of the synchronizer rings 16A and 16B on surfaces perpendicular to no-shown axes extending in radial direction and passing the center portions 28m.

The arm portions 28l at the first-speed gear side have projecting portions 28f and 28g projecting in the circumferential direction, respectively, and similarly, the arm portions 28l at the second-speed gear side have projecting portions 28f and 28g projecting in the circumferential direction, respectively. The projecting portions 28f at the first-speed gear side and the second-speed gear side are arranged symmetrical to each other with respect to the center of the thrust piece 28, and similarly, the projecting portions 28g at the first-speed gear side and the second-speed gear side are arranged symmetrical to each other with respect to the center.

Four slanted surfaces 28d and 28e are formed on outer side surfaces in the circumferential direction of the center-portion sides of the projecting portions 28f and 28g. The slanted surfaces 28d and 28e are formed at positions symmetrical with respect to the center and at four corners of the thrust piece 28 in such a way that one pair of the projecting portions 28f and 28g is provided at the first-speed gear side, while the other pair of the projecting portions 28f and 28g is provided at the second-speed gear side.

The widths between the one pair and the other pair are set larger as portions thereof depart further from the center portion 28m in the axial direction.

The slanted surfaces 28d respectively correspond to the slanted surfaces 18i and 18j of the hub 18 to be capable of selectively contacting with them, while the slanted surfaces 28e respectively correspond to the slanted surfaces 18h and 18k of the hub 18 to be capable of selectively contacting with them. These selections of the contact depend on the axial positions and the radial directions of the thrust pieces 28, which are moved due to the friction torque generated between the friction surfaces 16a and 12b, 14b of the synchronizer rings 16A and 16B and the gears 12 and 14 and thrust acting from the shift sleeve 24. Incidentally, at the neutral position, the slanted surfaces 28d and 28e do not contact with any one of the slanted surfaces 18h to 18k. In the synchronization operation, one of the four slanted surfaces 28d and 28e of the thrust pieces 28 contacts with one of the slanted surfaces 18h to 18k of the hub 18.

The slanted surfaces 28d and 28e are formed slightly like a concave arc when they are seen from in the radial direction when the thrust pieces 28 are assembled in the shift device.

On the other hand, the center portion 28m is formed with a center hole 28h at the center of the thrust piece 28 to receive a holder 36. The holder 36 is formed like a circular tube with a closed bottom portion 36a and an open top portion 36b. The top portion 36b is expanded in the direction perpendicular to the axial direction of the holder 36 to form a flange portion 36d, which has a diameter larger than that of the center hole 28h. The flange portion 36d is inserted into a circular hollow 28n formed on the outer surface 28j of the center portion 28m. The outer diameter of the holder 36 is set almost the same as that of the center hole 28h so that the holder 36 can be press-fitted into the center hole 28h. Consequently, the holder 36 is fixed to each of the thrust pieces 28, projecting toward the inner side in the radial direction when the thrust pieces 28 are assembled in the shift device. The axial length of the holder 36 is set in such a way that its bottom portion does not contact with any bottom portion of the cut-off portions 18f of the hub 18.

The holder 36 is provided with a hole 36c for containing a ball 30 and a spring 32. The diameter of the hole 36c is set larger than those of the ball 30 and the spring 32. The most radially outer portion near the flange portion 36d of the holder 36 is, however, narrowed in diameter so that its diameter becomes smaller than that of the outer diameter of the ball 30 in such a way that the ball 30 can partially project from the holder 36 toward the shift sleeve 24 but it cannot drop off from the holder 36.

The spring 32 provides elastic force to push the ball 30 outwardly in the direction and also push the holder 36 together with the thrust piece 28 inwardly in the radial direction due to the principle of action and reaction. The value of the elastic force of the spring 32 is set to overcome the centrifugal force acting on the thrust piece 28 outwardly in the radial direction and ensuring to press the inner surface 28k thereof on the guide surfaces 18m of the hub 18.

The three thrust pieces 28 constructed as described above are inserted in the three cut-off portions 18f of the hub 18, respectively. In a state where the shift device is assembled, the springs 32 press the ball 30 outwardly in the radial direction to partially project from the holders 36 and contact with the slanted surfaces 24e and 24f forming the grooves 24g of the shift sleeve 24.

On the other hand, as a result of action and reaction, the springs 32 press the holders 36 inwardly in the radial direction as described above. The thrust pieces 28 fixed with the holders 36 is also pressed inwardly in the radial direction so that the inner surfaces 28k of the thrust pieces 28 surface-contact with the guide surfaces 18m of the hub 18. Therefore, the bottom portions 36a are always apart from the cut-off portions 18f of the hub 18, and the outer surfaces 28j of the thrust pieces 28 are also apart from the inner surface of the shift sleeve 24. In other words, there are clearances between the outer surfaces 28j of the thrust pieces 29 and the inner surfaces of the shift sleeve 24 and between the bottom portions 36 of the holders 36 and the bottom portions 18n of the cut-off portions 18f of the hub 18. These features are different from those of the conventional shift devices explained above.

Next, the operation of the shift device of the embodiment will be described with reference to FIGS. 13 to 16.

Figure 13:
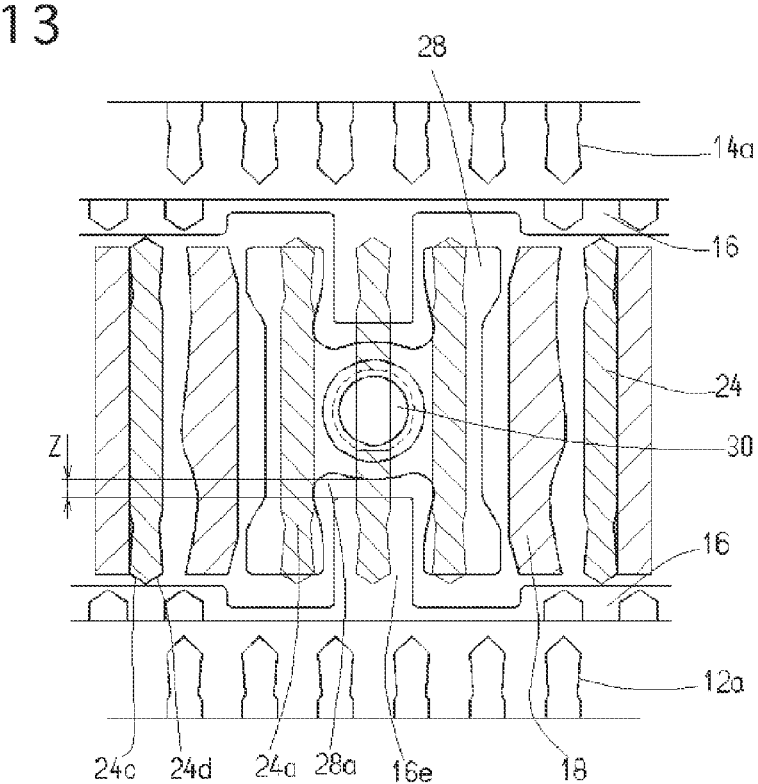
FIG. 13 is an enlarged and partially cross-sectional plan view explaining a state where the shift device of the embodiment is maintained at a neutral position, taken along a line B-B in FIG. 3.
Figure 14:
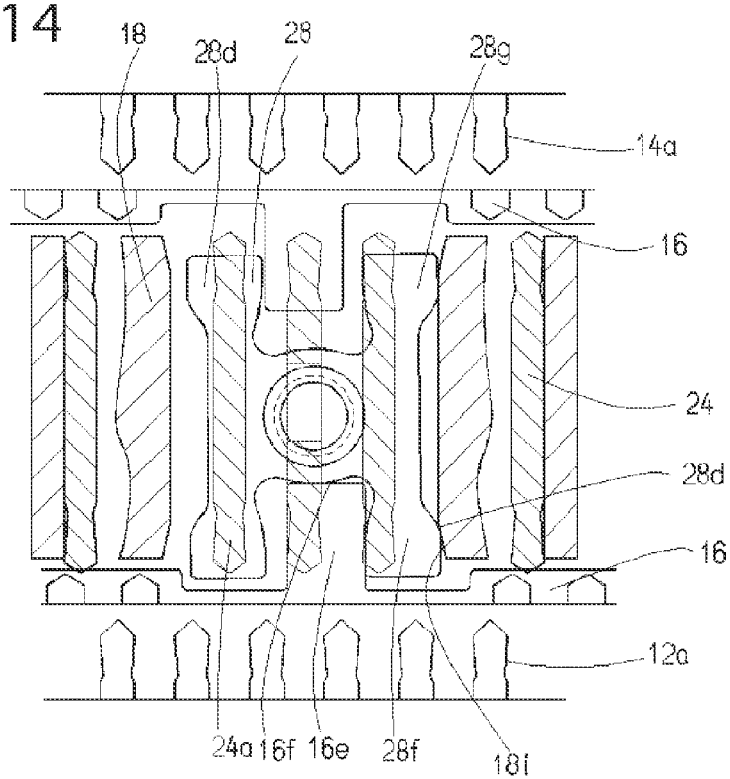
FIG. 14 is an enlarged and partially cross-sectional plan view explaining a state where the thrust pieces make a swing motion relative to the hub due to a shift operation in which the shift sleeve moves halfway toward the first-speed gear, taken along the line B-B in FIG. 3.
Figure 15:
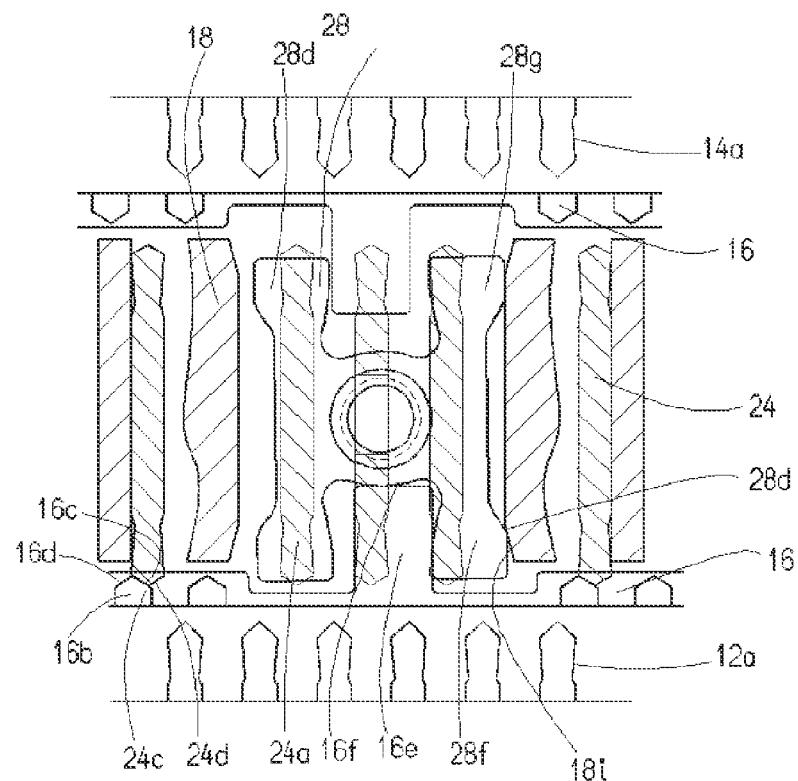
FIG. 15 is an enlarged and partially cross-sectional plan view explaining a self-servo operation state where chamfers formed on splines of the shift sleeve and the synchronizer ring contact with each other when the shift sleeve further moves toward the first-speed gear, taken along the line B-B in FIG. 3.

Incidentally, FIGS. 13 to 15 are enlarged partial development cross-sectional views in the circumferential direction, taken along the line B-B in FIG. 3, which are obtained by making a 90 degrees turn of the shift device shown in FIG. 3 in a clockwise direction, explaining different states when the shift device at the neutral position is shifted to the first speed position. Accordingly, the lower side in FIGS. 13 to 15 corresponds to the first-speed gear side, while the upper side therein corresponds to the second-speed gear side.

FIG. 3 and FIG. 13 show a state where the shift sleeve 24 is positioned at the neutral position. In this state, the balls 30 are pressed by the springs 32 outwardly in the radial direction to move at the highest position in the holders 36 and engage with the grooves 24g of the shift sleeve 24. The inner splines 24a of the shift sleeve 24 are disengaged from the outer splines 12a of the first speed gear 12 and the outer splines 14a of the second speed gear 14. Therefore, power from the input shaft cannot be transmitted through any one of the first speed gear 12 and the second speed gear 14 to the output shaft 10. In this state, the outer surfaces 28j of the thrust pieces 28 are apart from the inner surface of the shift sleeve 24, while the inner surfaces 28k of the thrust pieces 28 are pressed inwardly in the radial direction by the springs 32 to surface-contact with the guide surfaces 18m of the hub 18. In addition, there are clearances in the axial direction between the end portions 16f of the projections 16e of the synchronizer rings 16A, 16B and the bottom side surfaces 28b of the depressed portions 28a, as shown as the axial clearance at the first-speed gear side indicated by "z" in FIG. 3. Further, the slanted surfaces 28d and 28c do not contact with the slanted surfaces 18h to 18k of the hub 18.

In order to obtain the first speed, the shift sleeve 24 is moved toward the first gear 12. The thrust pieces 28 also move in the axial direction together with the shift sleeve 24 (toward the right side in FIG. 1 and toward the lower side in FIG. 14) because the balls 30 are contained in the holders 36 fixed with the thrust pieces 28, being pressed by the springs 32 to engage with the grooves 24g of the shift sleeve 24. That is, they are pushed in the axial direction by the slanted surfaces 24e of the shift sleeve 24 through the balls 30 at value according to the elastic force of the springs 32 and the centrifugal force acting on the balls 30.

This axial movement of the thrust pieces 28 together with the shift sleeve 24 causes the bottom side surfaces 28b thereof to contact with the end surfaces 16f of the projections 16e of the synchronizer ring 16A, clearing the clearance z therebetween. Incidentally, the clearance z is shown in FIG. 3. In addition, the thrust pieces 28 are positions where the slanted surfaces 28d and 28e of the thrust pieces 28a face to the slanted surfaces 18i of the hub 18h, respectively. In this state, the surfaces 28d and 28e are not contacted with the surfaces 18i and 18h.

As the shift sleeve 24 are further pressed toward the first speed gear 12, this press force functions as a thrust to contact the friction surface 16a of the synchronizer ring 16A with the cone-shaped friction surface 12b of the first speed gear 12.

When there is a difference between the rotational speed of the synchronizer ring 16A and that of the first speed gear 12 in a state where they are pressed against each other, a friction torque generates between the friction surfaces 16a and 12b thereof. The friction torque drags the synchronizer ring 16A in a rotational direction, which is determined by a rotational speed difference between the synchronizer ring 16A and the first speed gear 12.

The friction torque rotates the synchronizer ring 16A, but the rotational travel of the synchronizer ring 16A relative to the hub 18 is restrained by clearances in the circumferential direction determined between the projections 16e, 16g of the synchronizer ring 16A and the side wall surfaces 28c of the thrust pieces 28 and between the slanted surfaces 28d, 28e thereof and the slanted surfaces 18i, 18h of the hub 18h.

A relative rotational movement of the synchronizer ring 16A causes the slanted surfaces 28d to contact with the slanted surfaces 18i or the slanted surfaces 28e to contact with the slanted surfaces 18h. The contact relationship is determined according to the rotational direction of the friction torque. The rotational direction depends on which of the first speed gear 12 and the output shaft 10 rotates at a faster speed.

Specifically, when the first speed gear 12 rotates at a faster speed than the output gear 12 in such a case as a vehicle start, the synchronizer ring 16A is dragged in a direction where the slanted surfaces 28d of the thrust pieces 28 are contactable with the slanted surfaces 18i of the hub 18 but the slanted surfaces 28e are not contactable with the slanted surfaces 18h.

On the other hand, when the first speed gear 12 rotates a lower speed than the output shaft 10 in such a case as a case where the shift device is down-shifted to decrease a vehicle speed, the synchronizer ring 16A is dragged in a direction where the slanted surfaces 28e are contactable with the slanted surfaces 18h and the slanted surfaces 28d are not contactable with the slanted surfaces 18i.

FIG. 14 shows an example where the first speed gear 12 rotates at the higher speed than the output shaft 10, where the synchronizer ring 16A is dragged by the friction torque to rotate relative to the hub 18 and the shift sleeve 24. This relative rotation of the synchronizer ring 16A causes the slanted surfaces 28d to contact with the slanted surfaces 18i. Then the rotation movement of the synchronizer ring 16A relative to the hub 18 and the shift sleeve 24 is restrained when the thrust pieces 28 contact with the hub 18, causing the thrust pieces 28 to slightly swing around the slanted surface 18i of the hub 18. As long as there is a rotational speed difference between the first speed gear 12 and the output shaft 10, the friction torque keeps being generated between the friction surfaces 16a and 12b.

The projections 18e press the side wall portion 28c of the depressed portions 28a of the thrust pieces 28 in the circumferential direction, so that the slanted surfaces 28d is pressed on the slanted surfaces 18i of the hub 18. The slanted surfaces 28d and 18i change the friction force acting on the thrust pieces 28 from the synchronizer ring 16A to the thrust acting toward the first-speed gear 12.

The friction torque is changed in direction to the thrust to push the synchronizer ring 16A toward by the projection 18e In the swing movement of the thrust pieces 28, no resistance generates between the thrust pieces 28 and the shift sleeve 24 because the outer surfaces 28j of the thrust pieces 28 do not contact with the inner surface of the shift sleeve 24. In addition, the inner surfaces 28k of the thrust pieces 28 are surface-contacted with the guide surfaces 18m of the hub 18, and the inner surfaces 28k of the thrust pieces 28 and the guide surfaces 18m of the hub 18 are plain surfaces, so that the thrust pieces 28 smoothly swing being guided along the guide surfaces 18m.

Incidentally, as understood from the above-described explanation, the inner surfaces 28k and the guide surfaces 18m may have surfaces different from the plain surfaces as long as they can decrease the resistance generated therebetween while the thrust pieces 28 are swinging.

Therefore, during the swing movement, the thrust pieces 28 are prevented from inclining relative to the swing surface perpendicular to the radial axes passing through the centers of the thrust pieces 28.

When the shift sleeve 24 is further moved toward the first-speed gear 12, the chamfers 24c of the inner splines 24a of the shift sleeve 24 contact with the chamfers 16c of the outer splines 16b of the synchronizer ring 16A as shown in FIG. 15, because the synchronizer ring 16A is rotated at a position where the chamfers 24c face to the chamfers 16c as explained above. The contact of the chamfers 24c and 16c enables the shift sleeve 24 to directly press the synchronizer ring 24 toward the first speed gear 12. At the same time, the contact of the shift sleeve 24 and the synchronizer ring 16A prevents the shift sleeve 24 from further advancing toward the first speed gear 12 because of the following reason.

As well as in conventional Borg-Warner type synchronizer devices, the chamfers 24c and 16c of the shift sleeve 24 and the synchronizer rings 16A and 16B are set to have angles in such a way that the friction torque Tf always becomes larger than dividing torque Ts, where Tf is the friction torque generated between the friction surfaces 16a and 12b when they are pressed through the chamfers 24c and 16c, and Ts is the dividing torque generated between the chamfers 24c and 16c to disengage them from each other in the circumferential direction. Accordingly, the shift sleeve 24 is prevented from further advancing even when it is pressed toward the first speed gear 12 as long as the friction torque Tf is generated between the friction surfaces 16a and 12b.

As understood from the above-described explanation, a difference torque between the friction torque Tf and the dividing torque Ts acts on from the projections 16e of the synchronizer ring 16A to the side wall surfaces 28c of the thrust pieces 28, and then it finally acts on the slanted surface 18i of the hub 18 through the slanted surfaces 28d. Therefore, the difference torque is changed at the slanted surfaces 28c and 18i to the thrust. This thrust presses from the bottom side surfaces 28b to the end surfaces 16f of the synchronizer ring 16A toward the first speed gear 12.

As a result, the friction torque between the friction surfaces 16a and 12b generates according to the total value of the press force acting from the shift sleeve 24 to the synchronizer ring 16A and the thrust generated due to the contact of the slanted surfaces 28d and 18i. This means the friction torque increases by the torque due to the thrust generated due to the slanted surfaces 28d and 18i relative to that generated in the Borg-Warner type synchronizer device to perform a self-servo function in a synchronization operation. This improves a synchronization performance.

The synchronization operation causes the output shaft 10 to progressively increase its rotation speed up to that of the first speed gear 12. When there becomes no rotational speed difference, the friction torque vanishes between the friction surfaces 16a and 12b.

Then, the chamfers 24c of the shift sleeve 24 rotate back the synchronizer ring 16A to the original position in the circumferential direction through the chamfers 16c. This enables the shift sleeve 24 to further move toward the first speed gear. In this movement, the slanted surface 24e of the groove 24 of the shift sleeve 24 pushing the balls 30 inwardly in the radial direction against the elastic force of the spring 32 to disengage the balls 30 from the grooves 24g.

Figure 16:
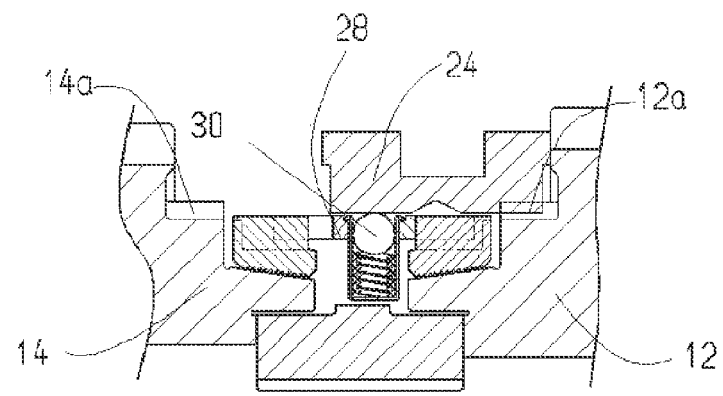
FIG. 16 is a cross-sectional side view showing a state where a shift operation from the neutral position to the first gear position ends in the shift device of the embodiment.

The shift sleeve 24 further moves toward the first speed gear 12, and the spline 24a of the shift sleeve 24 that always engage with the outer splines 18e of the hub 18 become to engage with the outer splines 12a of the first speed gear 12 as shown in FIG. 16. Therefore, the output shaft 10 is driven at the same rotational speed as that of the first speed gear 12. This is the end of the shifting to the first speed.

In cases to obtain the second speed, the operation is basically similar to that in the first speed, although the direction of movements of the shift sleeve 24 and the synchronizer ring 16B is opposite of that in the first speed. Accordingly, the friction surfaces to be contacted, the slanted surfaces to be contacted, and the depressed portions and the projections to be contacted are changed.

As understood from above, the shift device of the embodiment has the following advantages.

The thrust pieces 28 swing in the shift operations, the inner surfaces 28k thereof being pressed on the guide surfaces 18m of the hub 28, and the outer surfaces 28j being apart from the inner surface of the shift sleeve 24.

Therefore, the thrust pieces 28 can avoid from being inclined, and they can decrease resistance because the inner surfaces 28k and the guide surfaces 18m are formed flat and the outer surfaces 28j do not contact with the inner surface of the shift sleeve 24. This improves the synchronization performance of the shift device. In addition, the thrust pieces 28 can be manufactured easily, at lower cost and with higher accuracy because they can be made using plain plates.

While there have been particularly shown and described with reference to preferred embodiment thereof, it will be understood that various modifications may be made therein, and it is intended to cover in the appended claims and all such modifications as fall within the true spirit and scope of the invention.

The number of the thrust pieces 28 is three in the embodiments, but it is not limited and accordingly it may be two or more.

The speed gear is not limited to the first-speed gear or the second speed gear.

The output shaft 10 may be replaced by an input shaft or another shaft.

The construction and shape of the holder 36 may be arbitrarily changed according to its need and restrictions. The fixation of the holder 36 and the thrust piece 28 may be not limited to those in the embodiment.

The friction surfaces 16a, 17a, 12b, and 14b may be formed with an oil groove or like a screw on their outer surfaces. They may be coated on their surfaces with carbon material.

The entire contents of Japanese Patent Application No. 2013-153144 filed Jul. 24, 2013 are incorporated herein by reference.

What is claimed is:

1. A shift device with a synchronizer comprising:
a shaft that is capable of transmitting power;
a hub having a boss portion fixed to the shaft, a flange portion extending from the boss portion outwardly in a radial direction, and an annular portion provided on outer side of the flange portion and formed with outer splines on an outer side of the annular portion, the annular portion and the flange portion being formed in an axial direction with a plurality of cut-off portions, the cut-off portions being provided on four corners of end portions in the axial direction with a plurality of slanted surfaces that are capable of changing force in a rotational direction to force acting in the axial force, and the hub being provided with a plurality of guide surfaces;
a shift sleeve that is formed on an inner surface thereof with inner splines and a groove having slanted surfaces, the inner splines being engaged with the outer splines of the hub in such a way that the shift sleeve is movable in the axial direction, and the inner splines being provided with chamfers on the both end portions of the inner splines;
a pair of speed gears that are arranged at the both sides in the axial direction of the hub to be rotatably supported on the shaft, the speed gears being provided at hub sides thereof with a cone-shaped friction surface and outer splines engageable with the inner splines of the shift sleeve;
a pair of synchronizer rings that are respectively arranged between the hub and the speed gears, the synchronizer rings being provided with a friction surface capable of being pressed selectively by one of the cone-shaped friction surfaces of the speed gears, and the synchronizer rings being provided with projections extending in the axial direction and outer splines engageable with the inner splines of the shift sleeve and having chamfers on an outer circumference thereof to be contactable with the chamfers of the shift sleeve; and
a plurality of thrust pieces that are arranged in the cut-off portions of the hub, respectively, the thrust pieces having radially outer surfaces, radially inner surfaces, and slanted surfaces on four corner sides to be contactable with the slanted surfaces of the hub to change the force in the rotational direction generated due to friction torque between the friction surfaces to the force acting in the axial force when the thrust pieces swing relative to the hub, the thrust pieces provided with depressed portions to be contactable with the projections of the synchronizer rings, and the thrust pieces respectively having holders each containing a ball and a spring; wherein
the holders are fixed to the thrust pieces, and wherein
the springs elastically press the balls outwardly in the radial direction against the groove of the shift sleeve, pressing the radially inner surfaces of the thrust pieces on the guide surfaces of the hub through the holders to be configured in such a way that a clearance between the radially outer surfaces of the thrust pieces and the inner surface of the shift sleeve is ensured and the thrust pieces can swing being guided along the guide surfaces.

2. The shift device according to claim 1, wherein the inner surfaces of the thrust pieces and the guide surfaces of the hub are formed as a flat surface.

3. The shift device according to claim 2, wherein the holders are formed like a cylinder, wherein the holders are press-fitted into holes formed in center portions of the thrust pieces, respectively.

4. The shift device according to claim 3, wherein bottom portions of the holders are apart from bottom portions of the cut-off portions.

5. The shift device according to claim 1, wherein the holders are formed like a cylinder, wherein the holders are press-fitted into holes formed in center portions of the thrust pieces, respectively.

6. The shift device according to claim 5, wherein bottom portions of the holders are apart from bottom portions of the cut-off portions.

7. The shift device according to claim 1, wherein bottom portions of the holders are apart from bottom portions of the cut-off portions.

8. The shift device according to claim 2, wherein bottom portions of the holders are apart from bottom portions of the cut-off portions.

* * * * *